United States Patent
de Souza, Filho

(10) Patent No.: US 7,467,915 B2
(45) Date of Patent: Dec. 23, 2008

(54) MODULAR DRILL

(75) Inventor: Ruy Frota de Souza, Filho, Latrobe, PA (US)

(73) Assignee: Kennametal Inc., Latrobe, PA (US)

(*) Notice: Subject to any disclaimer, the term of this patent is extended or adjusted under 35 U.S.C. 154(b) by 38 days.

(21) Appl. No.: 11/869,296

(22) Filed: Oct. 9, 2007

(65) Prior Publication Data

US 2008/0025806 A1 Jan. 31, 2008

Related U.S. Application Data

(62) Division of application No. 10/958,277, filed on Oct. 6, 2004, now Pat. No. 7,116,913.

(51) Int. Cl.
*B23B 51/00* (2006.01)
*B23B 51/02* (2006.01)

(52) U.S. Cl. .................. 408/231; 408/144; 408/713

(58) Field of Classification Search .......... 408/226, 408/227, 231–233, 713, 230; 407/30, 56
See application file for complete search history.

(56) References Cited

U.S. PATENT DOCUMENTS

| | | | | |
|---|---|---|---|---|
| 5,957,631 A | * | 9/1999 | Hecht | 408/144 |
| 6,059,492 A | * | 5/2000 | Hecht | 408/144 |
| 6,276,879 B1 | * | 8/2001 | Hecht | 409/234 |
| 6,485,235 B1 | * | 11/2002 | Mast et al. | 408/1 R |
| 7,306,410 B2 | * | 12/2007 | Borschert et al. | 408/144 |
| 7,360,974 B2 | * | 4/2008 | Borschert et al. | 408/231 |

* cited by examiner

*Primary Examiner*—Willmon Fridie
(74) *Attorney, Agent, or Firm*—Larry R. Meenan

(57) ABSTRACT

A drill having a replaceable cutting head, modified to eliminate forces which would distort the pocket of the drill shank and otherwise concentrate stresses which would cause failure of the drill. The cutting head has a frustoconical depending connecting member received in a receptacle formed in the shank. In different embodiments, contact between the pocket formed in the shank and the cutting head connecting member is limited. In one embodiment, angle of drive surfaces is modified from prior art practice. In another embodiment, transition of at curved joints between vertical and horizontal surfaces is made more gradual. The drill preferably has flutes formed collectively by the shank and cutting head when assembled.

8 Claims, 7 Drawing Sheets

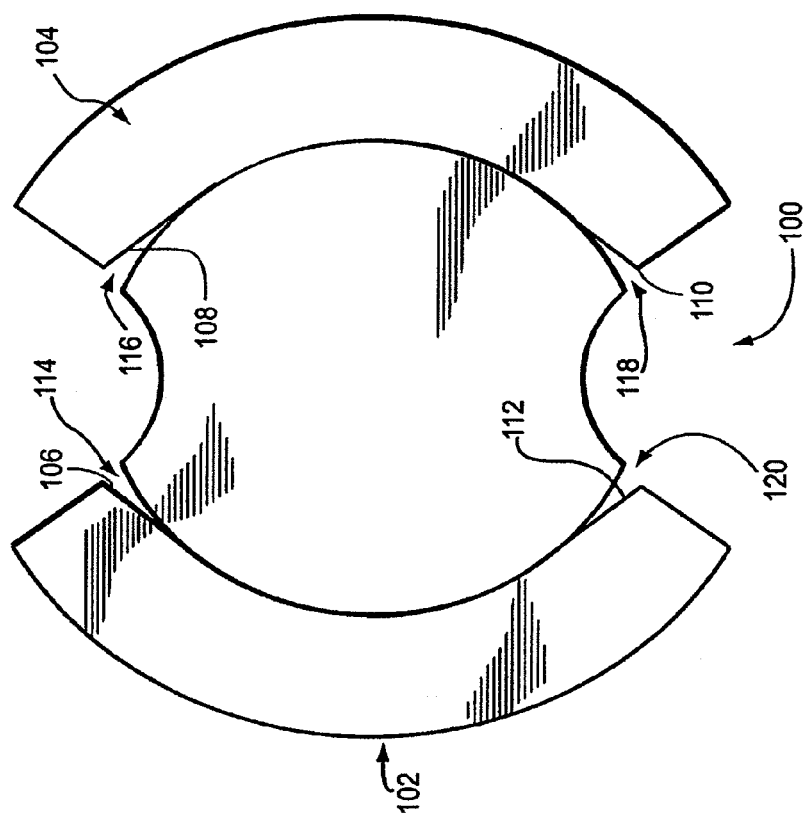
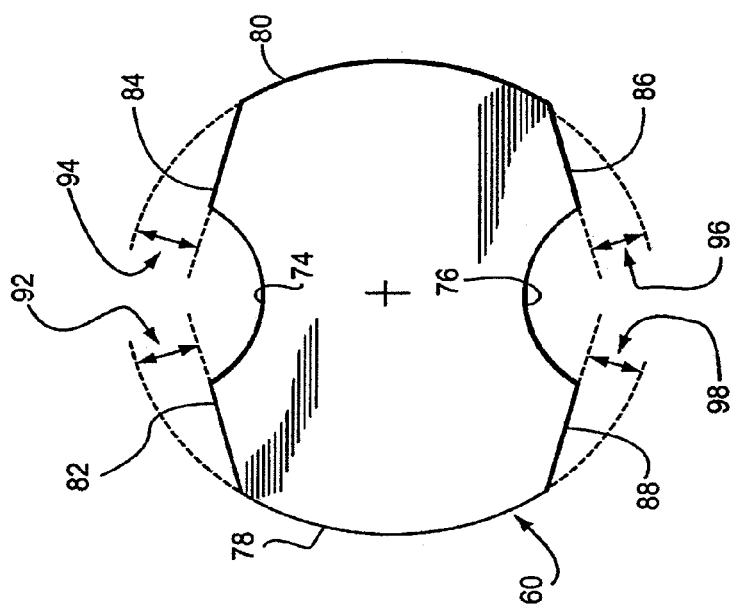

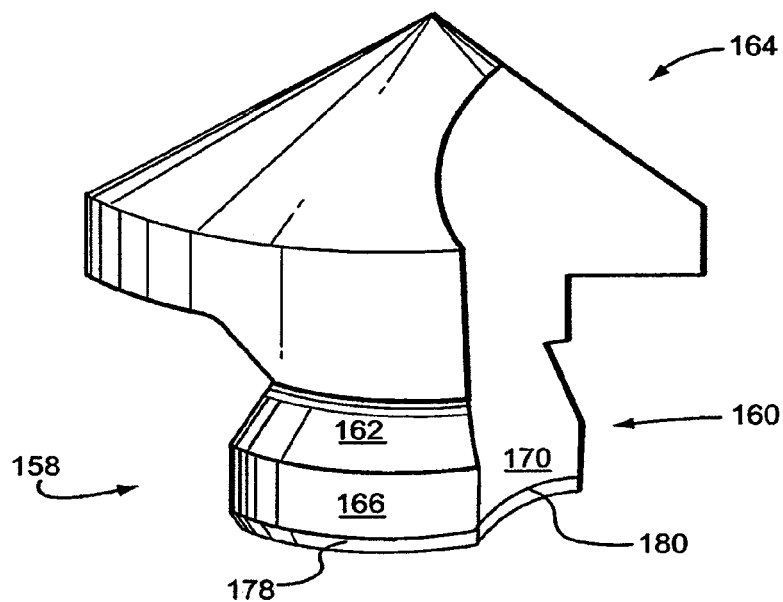
Fig. 6
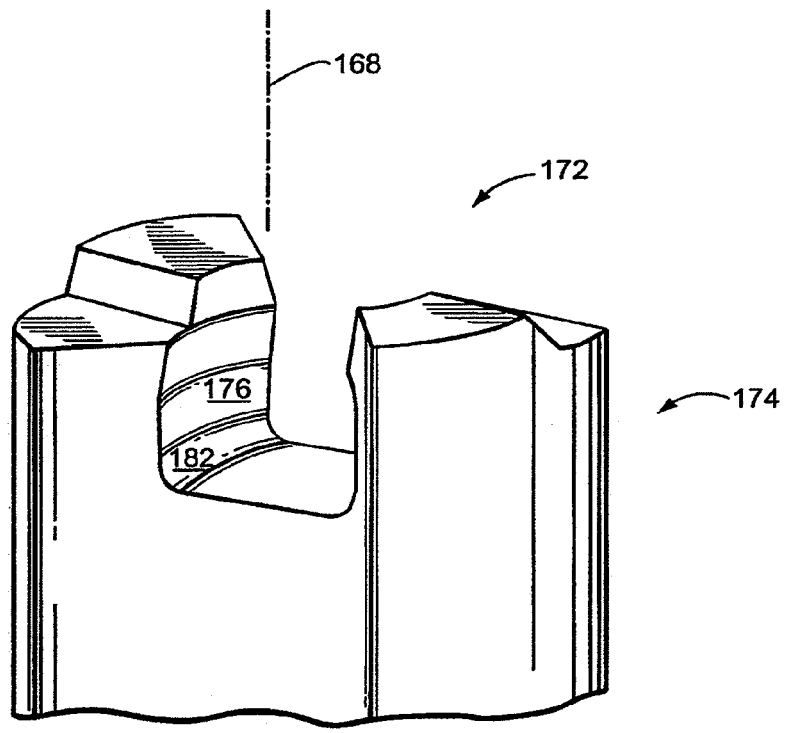

MODULAR DRILL

CROSS-REFERENCE TO RELATED APPLICATIONS

This application is a divisional of U.S. patent application Ser. No. 10/958,227 filed Oct. 6, 2004 now U.S. Pat. No. 7,116,913, which is herein incorporated by reference.

FIELD OF THE INVENTION

The present invention relates to cutting tools, and more particularly to modular drills having replaceable cutting tips.

DESCRIPTION OF THE RELATED ART

Drills having replaceable cutting tips are known. Illustratively, such tools are shown in U.S. Pat. Nos. 5,957,631 and 6,059,492, both issued to Gil Hecht on Sep. 28, 1999, and May 9, 2000, respectively. The subject drills have replaceable cutting heads which are mounted on shanks. The cutting heads and shanks display continuous and complementing configuration as fluted drills. To this end, each shank has structure for retaining and rotating an associated cutting head. The associated cutting head has complementing structure for being retained and rotated by the shank. While these devices will operate under some circumstances, closer analysis reveals that their useful lives are potentially unduly limited. More specifically, the retaining and drive structure of the shank is subject to deformation and failure during its service life due to concentration of stresses imposed during ordinary service.

SUMMARY OF THE INVENTION

The present invention provides modifications to drills having replaceable cutting tips, of the type shown in the above referenced patents to Hecht. The modifications of the present invention alter stresses imposed on the shanks such that the shanks either do not undergo deformation and outright failure while in service or alternatively, increase the service life achievable before deformation renders the tool unusable. These modifications generally connote prevention of direct contact of a replaceable cutting head with the shank at certain specified locations. Also, orientations of certain abutting surfaces are modified so that stresses are imposed differently from the original design of Hecht.

One specific example of modifications is that of providing a gap between a frustoconical dovetail formed in the cutting head and a cooperating recess formed in the shank, at the forward and rearward areas of mutual contact. The area of contact is limited to that portion between the forward and rearward areas of contact. A second modification is that of altering the angle of drive or torque transmission surfaces from purely radial to inclined relative to a purely radial direction. This has the effect of redistributing forces which would otherwise act on the walls of a pocket formed in the shank. The pocket, which receives the connection structure of the cutting head, then better resists distorting forces. A third modification is that of lengthening at the walls of that portion of the body forming a pocket which receives the cutting head and eliminating sharp corners in this region of the body. In still another modification, the floor of the pocket is modified in the manner of the third modification.

These modifications redistribute distorting forces away from portions of the shank which are more susceptible to distortion to portions of the shank better able to withstand these forces. The ultimate effect is to increase the useful service life of the shank due to reduced distortion of the pocket.

BRIEF DESCRIPTION OF THE DRAWINGS

Further features of the present invention, as well as the advantages derived therefrom, will become clear from the following detailed description made with reference to the drawings in which:

FIG. 2 is an end elevational detail view of the lower end of the upper component of FIG. 1, but showing an alternative embodiment thereof.

FIG. 3 is a cross sectional view of a further embodiment of the invention. The cross section corresponds to that which could be taken through the components of FIG. 1 if the components of FIG. 1 were assembled in axial abutment.

FIG. 6 is a partial, exploded view of another embodiment of the invention.

DESCRIPTION OF THE PREFERRED EMBODIMENTS

Figure 1:
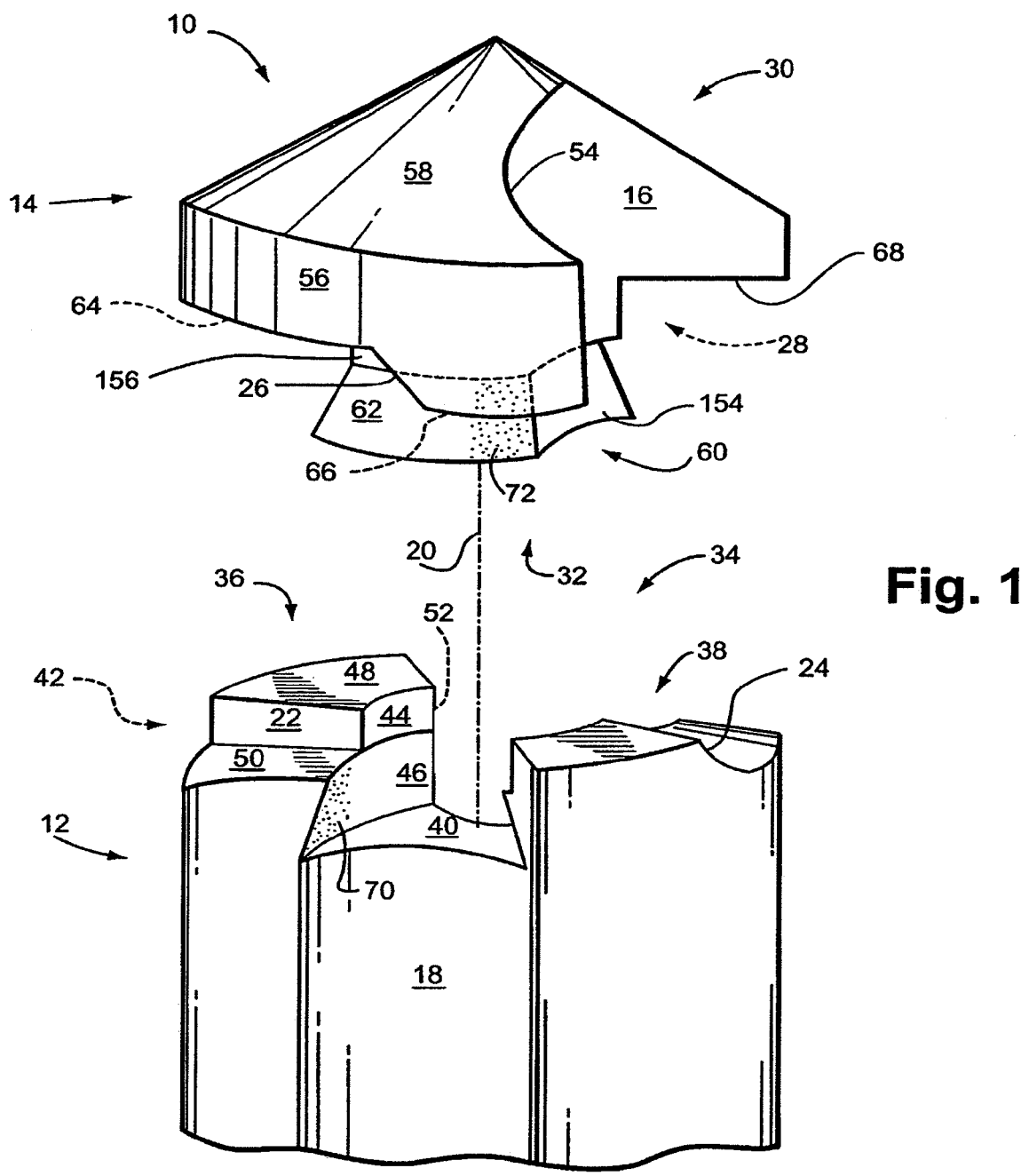
FIG. 1 is a partial, exploded perspective view of one embodiment of the modular drill of the present invention.

The documents, patents and patent applications referred to herein, including those pertaining to the prior art, are hereby incorporated by reference in their entirety. FIG. 1 of the drawings shows a first embodiment of a cutting tool assembly 10 for conducting rotary cutting operations on a work piece (not shown), comprising a tool shank 12 and a replaceable cutting head 14 which is installed on and engages tool shank 12. Cutting tool assembly 10 is a modular drill which in the preferred embodiments is of the so-called twist drill type, having helical flutes disposed along the sides of the drill. In the embodiment of FIG. 1, two flutes are provided in diametric opposition to one another, only one flute being visible. The visible flute has a lateral recess forming part of a flute, or cutting head flute portion 16 formed in cutting head 14. A corresponding or complementing lateral recess or shank flute portion 18 is formed in shank 12. The depiction of FIG. 1 shows cutting head 14 in a position for initially being installed on shank 12. In this initial position, cutting head 14 is rotated about ninety degrees with respect to rotational axis 20 of cutting tool 10, which rotational axis 20 is common to both shank 12 and also cutting head 14. Installation of cutting head 14 requires that cutting head 14 be lowered into abutment or near abutment with shank 12 and rotated in a direction opposite that of rotation during cutting operations. This installation procedure will both interlock cutting head 14 with shank 12 at certain respective mating peripheral surfaces in a manner precluding disengagement in the axial direction, taken with respect to axis 20, and will also assure abutment of driving surfaces 22, 24 of shank 12 with corresponding driven surfaces 26, 28 of cutting head 14. Driving surfaces 22, 24 of shank 12 are oriented to abut and bear against driven surfaces 26, 28 of cutting head 14 and thereby rotate cutting head 14 in tandem with shank 12 when shank 12 is rotated by its associated cutting tool such as a hand drill, drill press, machine tool, or the like (none shown).

Once cutting head 14 is installed on shank 12, the flute collectively formed by cutting head flute portion 16 and shank flute portion 18 will align to form a flute in generally continuous and undistorted fashion. A similar flute is of course formed on the other side of cutting tool 10. Although two flutes are preferred, any number of flutes including only one is possible.

In the depiction of FIG. 1, cutting head flute portion 16 emerges at a leading end 30 of cutting tool 10. Leading end 30 is defined for semantic purposes, and is that end which engages a work piece (not shown) when cutting. During cutting operations, cutting tool 10 is mounted in the rotary cutting tool, rotated, and advanced progressively into the work piece as cutting progresses. That end of cutting tool located oppositely leading end 30 is termed the trailing end 32. The terms "leading end 30" and "trailing end 32" are semantic devices which apply equally to shank 12 and cutting head 14 as they connote directional orientation with respect to longitudinal and rotational axis 20 rather than specific structure. Leading end 30 is that which penetrates a work piece (not shown), and trailing end 32 is that end opposed to leading end 30.

That portion of shank 12 which couples to and rotates cutting head 14 is referred to as pocket 34. The principal elements of pocket 34 include two generally symmetrical and similar castellated wall sections 36, 38. Wall section 36 will be described, it being understood that wall 38 is a generally symmetrical counterpart thereof. Wall section 36 is essentially a continuation of the body of shank 12 which projects upwardly in the depiction of FIG. 1 past a central floor portion 40 of shank 12, along the outer periphery of shank 12. Wall section 36 has a smooth outer surface 42 which conforms to and is generally coextensive with the generally cylindrical outer surface of cutting tool 10. At the interior of wall section 36, the term "interior" referring to those surfaces facing axis 20, wall section 36 has an internally facing, generally cylindrical face 44 and a frustoconical face 46. Wall section 36 also has an upwardly facing upper face 48, an upwardly facing lower face 50, and a lateral face 52. Lateral face 52 is located on a side opposite that of driving surface 22.

Cutting head 14 has cutting edges (only cutting edge 54 is visible in FIG. 1), a peripheral generally cylindrical outer surface 56, and a leading conical surface 58 which conical surface 58 is of course interrupted or incomplete due to presence of the flutes. Cutting edge 54 and leading conical surface 58 collectively form a cutting portion which performs cutting operations to the work piece.

Any or all of central floor portion 40, faces 48 and 50, and faces formed in wall portion 38 corresponding to faces 48 and 50 serve as abutment surfaces which abut cutting head 14 when cutting head 14 is installed on shank 12.

Cutting head 14 has a shank connection portion opposite the cutting portion, or alternatively stated, facing the trailing end of cutting head 14, in the form of an interlocking member arranged to retain cutting head 14 within pocket 34 of shank 12. In the embodiment of FIG. 1, this interlocking member comprises a dovetail member 60 which is located centrally along rotational axis 20. Dovetail member 60 is so-called due to its characteristic frustoconical lateral surface 62 which surface 62 is arranged at an obtuse angle to rotational axis 20.

Dovetail member 60 provides an interlocking member corresponding to and engaging pocket 34, which pocket 34 serves as an interlocking member of shank 12. Surrounding dovetail member 60 is a peripheral base surface facing pocket 34, comprising cutting head faces 64, 66, 68, which face downwardly in the depiction of FIG. 1. It should be understood at this point that cutting head 14 is generally bilaterally symmetrical, so that cutting head face 64 is generally a mirror image of cutting head face 68. Similarly, there exists a cutting head face not visible in FIG. 1 and not identified by reference numeral, which is diametrically opposed to and generally rotationally symmetrical about the central axis. In those embodiments wherein there may be three flutes, for example, there will accordingly be three rather than two similar cutting head faces corresponding to cutting heads 64, 66 disposed about the periphery of the cutting head.

Faces 64, 66 may be stepped, or located at different levels or points along axis 20, in the same manner as and to correspond to the axial spacing apart of faces 48 and 50 of shank 12. Any or all of faces 64, 66 serve as abutment surfaces for abutting shank 12. Abutment of faces 64, 66 with their corresponding surfaces 48, 50 of shank 12 seats cutting head 14 on shank 12 responsive to compressive axial loading. When rotated into the interlocked position with respect to pocket 34, dovetail member 60 will engage interior frustoconical face 46 of pocket 34, thereby preventing disengagement in the axial direction away from shank 12.

It is an important feature of the invention that contact between frustoconical face 46 and frustoconical lateral surface 62 be limited such that contact not occur over the entire extent of face 46 or lateral surface 62. Rather, frustoconical face 46 and frustoconical lateral surface 62 are dimensioned and configured to abut mutually along part of the extent of surface 62 and to avoid making contact along the balance of lateral surface 62. This characteristic enables pocket 34 to experience minimized forces imposed thereon during cutting operations by cutting head 14, which forces would otherwise tend to spread or distort pocket 34. Alternatively stated, although tangential forces remain unchanged, forces imposing a radially outward component are minimized at critical areas. Pocket 34 is thus less subject to distorting forces which would otherwise cause pocket 34 to spread over time of use, thereby shortening the useful life of shank 12. Representative areas 70, 72 of non-contact between face 46 and surface 62 are shown stippled in FIG. 1.

Non-contact of face 46 and surface 62 may be accomplished in several ways. Turning now to FIG. 2, dovetail member 60 is seen in bottom plan. The periphery of dovetail member 60 includes reliefs 74, 76 to allow for chip flow after installation, arcuate sections 78, 80, and chamfers 82, 84, 86, 88. Chamfers 82, 84, 86, 88 reduce the overall diameter of trailing surface 90 of dovetail member 60. The resulting discrepancy between the full diameter and that at any of chamfer 82, 84, 86, or 88 is indicated by arrowheads as gaps 92, 94, 96, 98 which exist between respective chamfers 82, 84, 86, 88 and extensions (shown in broken lines) of the arcuate configuration of the periphery of surface 90. In the embodiment of FIG. 2, then, contact between dovetail member 60 and face 46 of pocket 34 is made along arcuate sections 78 and 80, but is avoided at chamfers 82, 84, 86, 88, where the diameter of dovetail member 60 is reduced. The pocket of the shank (neither shown) which corresponds to dovetail member 60 thus contacts only first and second arcuate portions 78, 80 of dovetail member 60, and avoids contacting chamfered portions 82, 84, 86, 88.

Referring now to FIG. 3, which is an end view of a dovetail member 100 of a cutting head (not shown in its entirety)

installed in a pocket (not shown in its entirety) of a shank, a similar effect is obtained by chamfering walls 102, 104 of the pocket. The cutting head associated with dovetail member 100 may be essentially similar to cutting head 14 of FIG. 1. The shank of FIG. 3, apart from chamfering discussed herein, is essentially similar to shank 12 of FIG. 1, similarity extending to the pocket. In the embodiment of FIG. 3, chamfered portions 106, 108, 110, 112 formed in internally facing surfaces of pocket walls 102, 104 create gaps 114, 116, 118, 120 which provide functions similar to those of gaps 92, 94, 96, 98 of the embodiment of FIG. 2. Gaps 114, 116, 118, 120 separate the arcuate sections (not specifically called out by reference numeral) of pocket walls 102, 104 from dovetail member 100 at the ends of pocket walls 102, 104. Thus the internally facing surfaces of pocket walls 102, 104 contact dovetail member 100 only at their respective arcuate sections and avoid making contact at chamfered portions 106, 108, 110, 112. The difference between the embodiments of FIGS. 2 and 3 is that in the embodiment of FIG. 2, dovetail member 90 receives chamfering, whereas in the embodiment of FIG. 3, walls 102, 104 of the pocket of the shank receive chamfering.

The dovetail member is limited to an extent less than the full extent of the internally facing surfaces of the pocket when the cutting head is installed in the pocket. More particularly, it is presently preferred that the zone of contact extend along the interior of each of walls 124A and 126A within a range of about fifteen to about seventy-five degrees.

Figure 4A:
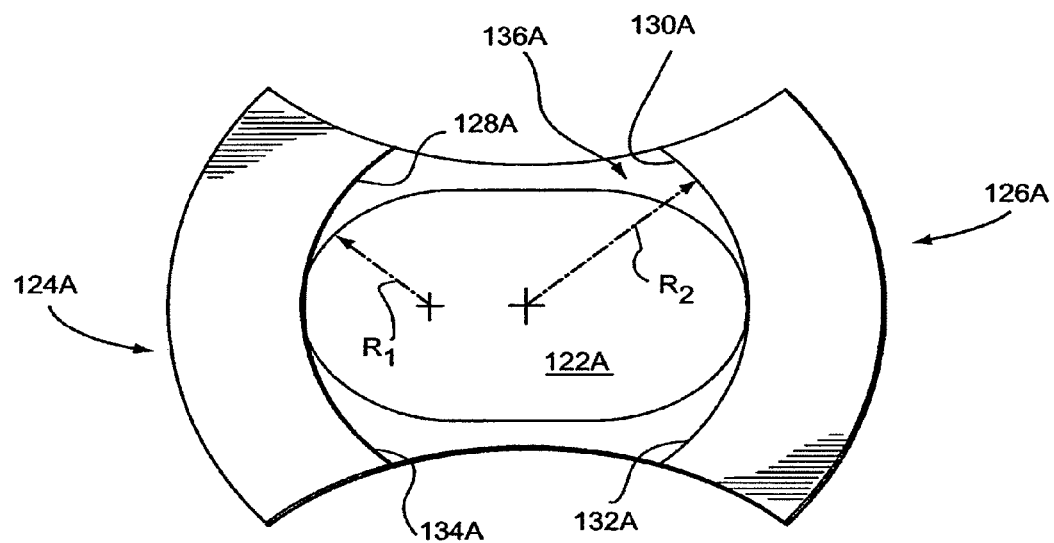
FIG. 4A is a cross sectional view of a still further embodiment of the invention, corresponding to FIG. 3 but with structure modified therefrom.

FIG. 4A shows an embodiment of the invention utilizing a third way of limiting contact between a dovetail member 122A of a cutting head (not shown in its entirety) and the pocket of a shank (not shown in its entirety). In FIG. 4A, walls 124A, 126A of the pocket may be identical to their counterparts in FIG. 1. In the embodiment of FIG. 4A, dovetail member 122A is non-circular in cross section, such as oblong. Radius $R_1$ defines that part of the outer contour of dovetail member 122A which contacts wall 124A, it being understood that a similar radius defines the opposing end of dovetail member 122A. Radius $R_2$ defines the inner contours of wall 126A (a similar radius defines the inner contour of wall 124A). In the embodiment of FIG. 4A, the radius of curvature of the interior wall of the pocket is greater than the radius of curvature of the exterior surface of dovetail member 122A. These radii and related dimensions and configuration are selected and arranged such that contact of dovetail member 122A with the inside surfaces of walls 124A, 126A occurs along only a portion of the inside surfaces of walls 124A, 126A. End zones 128A, 130A, 132A, 134A of walls 124A, 126A are not contacted by dovetail member 122A. This leaves gaps such as gap 136A at zone 130A, corresponding gaps (not identified by reference numerals) existing at the other end zones 128A, 132A, 134A.

Figure 4B:
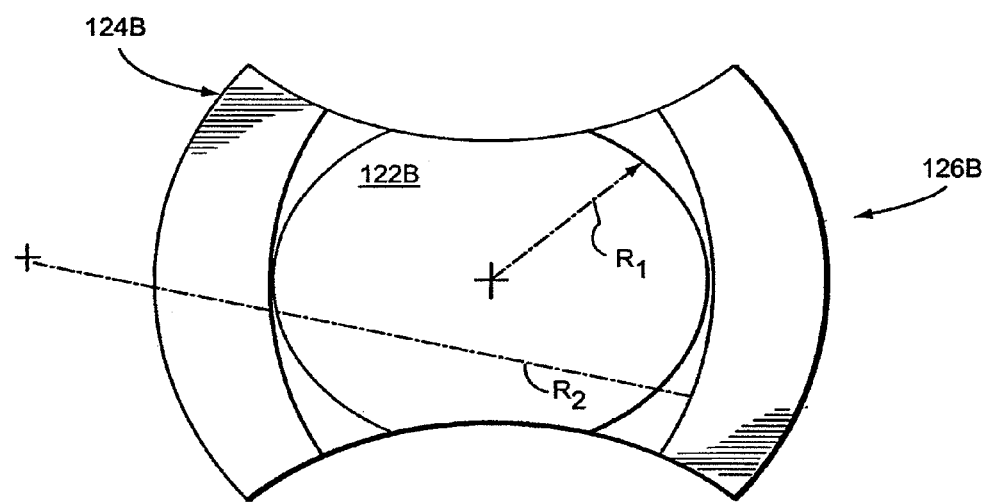
FIG. 4B is a cross sectional view of still another embodiment of the invention, corresponding to FIG. 4A, but with structure modified therefrom.

FIG. 4B shows an alternative to the embodiment of FIG. 4A. In the embodiment of FIG. 4B, the radius of curvature of the interior walls of the pocket exceeds the radius of curvature of the exterior surface of the contacting portion of the dovetail member, although this is achieved in a manner different from that of the embodiment of FIG. 4A. In FIG. 4B, radius $R_1$ of dovetail member 122B originates at the rotational axis of the tool holder. As employed here, the interior surface is that surface of pocket wall 124B or 126B which contacts the dovetail member 122B.

Figure 5:
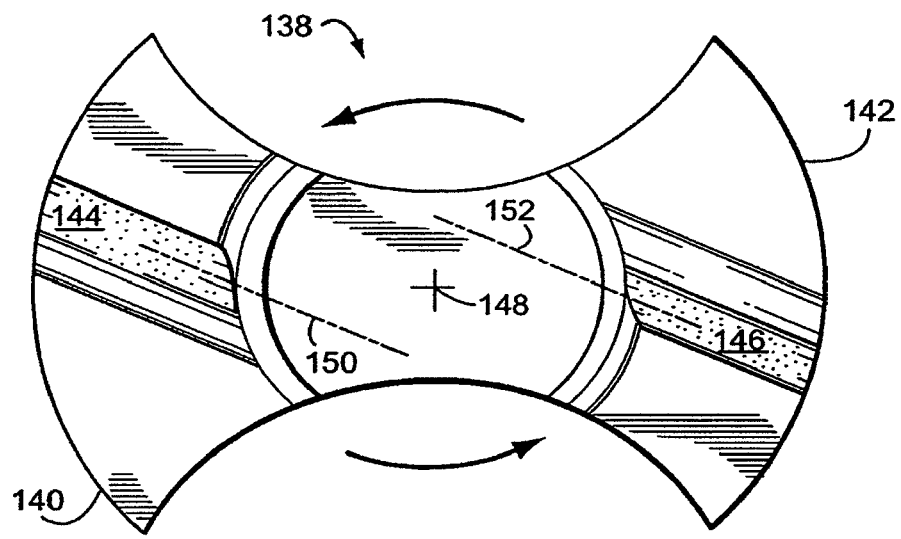
FIG. 5 is a top plan view of an alternative embodiment of the lower component of FIG. 1.

The aforementioned embodiments all relate to ways of limiting contact of a dovetail member with pocket walls. The effect of limiting contact in this manner is that the uncontacted portion of the walls of the pockets of the embodiments of FIGS. 1, 2, 3, 4A, and 4B serve to allow tangential deflection of the pocket walls mitigating radial deflection which would create additional stress on the pocket walls. In another type of modification, and referring now to FIG. 5, structure is introduced to accommodate forces acting on a pocket of a shank 138. The pocket of shank 138 includes two walls 140, 142 bearing respective driving surfaces 144, 146. In the view of FIG. 5, driving surfaces 144, 146 are inclined relative to axis of rotation 148, and thus are visible in this end view. Orientation of surfaces 144, 146 is such that if hypothetically extended, as shown by straight projection lines 150, 152, these projection lines 150, 152 avoid overlying axis of rotation 148. Surfaces 144, 146 are oriented with respect to the direction of rotation of shank 138, which as indicated by arrows in FIG. 5 is counterclockwise. It will be seen that the innermost portion of surface 144, that being the closer to axis of rotation 148, is the leading side, whereas the outermost portion of surface 144 is the trailing side. If the direction of rotation were reversed (although this embodiment is not shown), then projection line 150 associated with surface 144 would extend not from the upper left to the lower right, but rather from the lower left to the upper right. The same relationships hold true but in mirror image for surface 146. By contrast, in the prior art devices, driving surfaces corresponding to surfaces 144 and 146 are generally arranged radially from the axis of rotation. The modification of the present invention redistributes forces which would promote greater or more quickly occurring opening or spreading of the pocket in the prior art designs.

FIG. 6 shows a modification to the embodiment of FIG. 1. In FIG. 1, dovetail member 60 has a relief 154 which modifies the otherwise frustoconical configuration, and an extension 156. This configuration is modified in the embodiment of FIG. 6 such that an extension 158 is formed in dovetail member 160 below frustoconical lateral surface 162 of a cutting head 164. As in the embodiment of FIG. 1, lateral surface 162 is oriented at an obtuse angle to axis of rotation 168. Extension 158 has an outer partially cylindrical surface 166 which is in addition to surface 162, and a recessed incuse partial surface 170. To accommodate this additional structure, pocket 172 of shank 174 has surfaces (only surface 176 is visible in FIG. 6) corresponding to surface 166 of extension 158 that do not make contact. Extension 158 also has a beveled or a radiused surface including partial beveled surface 178 and incuse partial beveled or radiused surface 180. Pocket 172 has corresponding surfaces (only radiused surface 182 is visible) to enable cutting head 164 to be received in pocket 172. In other respects, both cutting head 164 and shank 174 are similar to their counterparts in other embodiments.

Figure 7:
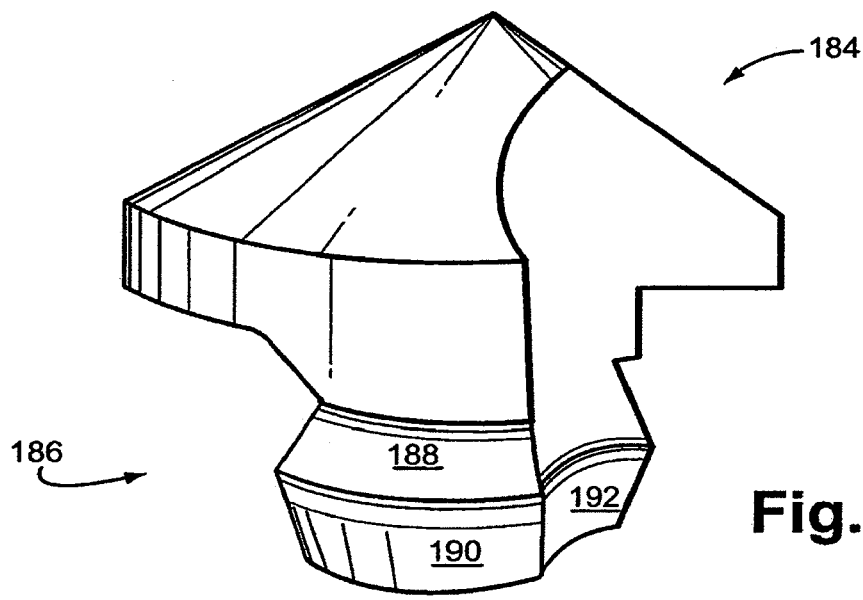
FIG. 7 is a perspective detail view of a further embodiment of the upper component of FIG. 1.

It would be possible to eliminate cylindrical surfaces 166, 170 from extension 158. As seen in FIG. 7, this is the case in cutting head 184, which has a dovetail member 186 bearing an upwardly facing frustoconical surface 188 for interlocking to a pocket of a shank (not shown), and a downwardly facing frustoconical surface 190. An incuse recess 192 is formed in dovetail member 186. The shank which is to be used with cutting head 184 would of course have configured therein surfaces to accommodate surfaces 188, 190, 192 of cutting head 184 to assure secure retention of cutting head 184 by surface 188 and the corresponding surface in the pocket. In other respects, both cutting head 184 and its associated shank are functionally and structurally similar to their counterparts in other embodiments of the invention. It will be appreciated that surface 190 does not contact the pocket walls.

The effect of the modifications of the embodiments of FIGS. 6 and 7 is to increase the overall length of frustoconical lateral surface 62, which in the embodiment of FIG. 1 is not extended. This increased length, regardless of whether the added length extends straight down (surface 166 of FIG. 6) or is tapered (surface 190 of FIG. 7) allows for a smooth transition between either of the surfaces corresponding to frustoconical surfaces 162 and 188 (FIGS. 6 and 7) of the pocket in relation to the pocket floor thereby minimizing stress concentration.

Figure 8:
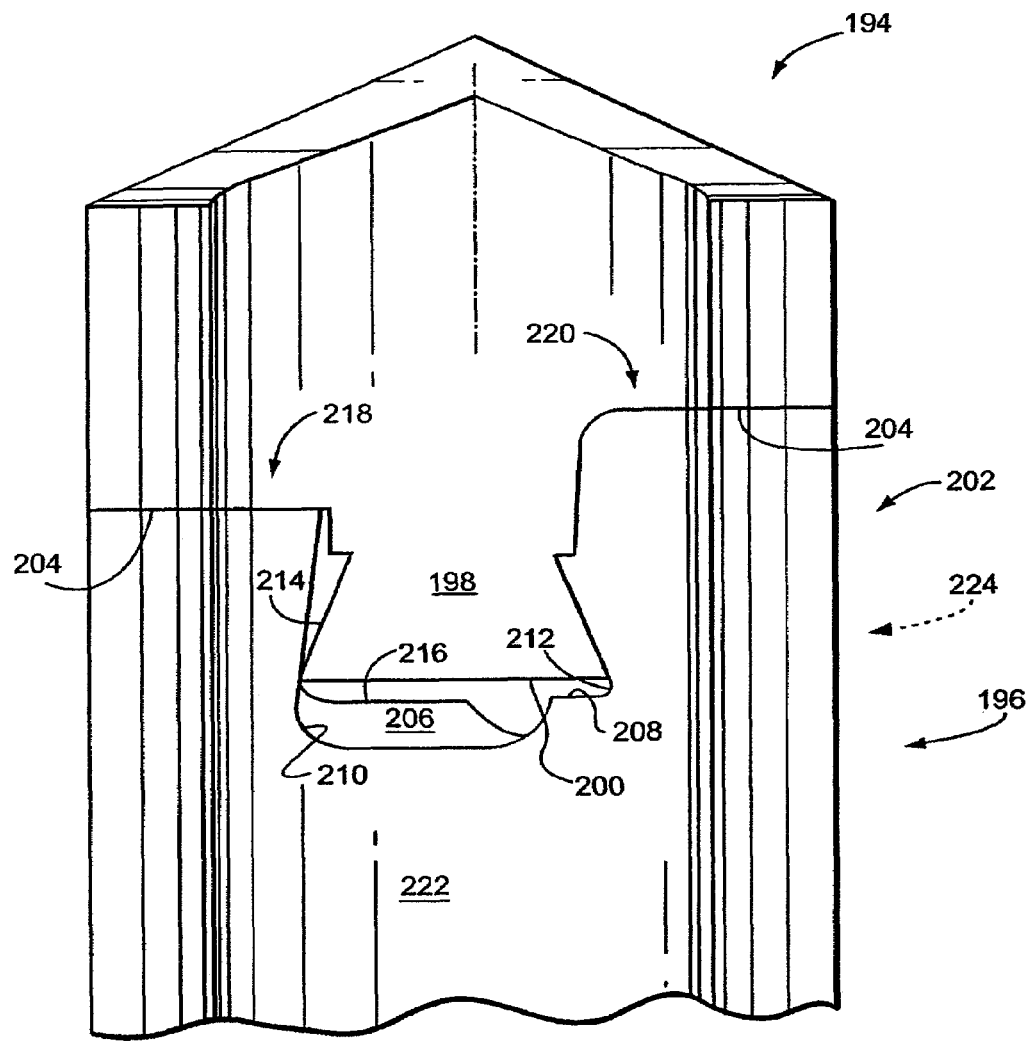
FIG. 8 is a partial, side elevational view of a still further embodiment of the invention.
Figure 9:
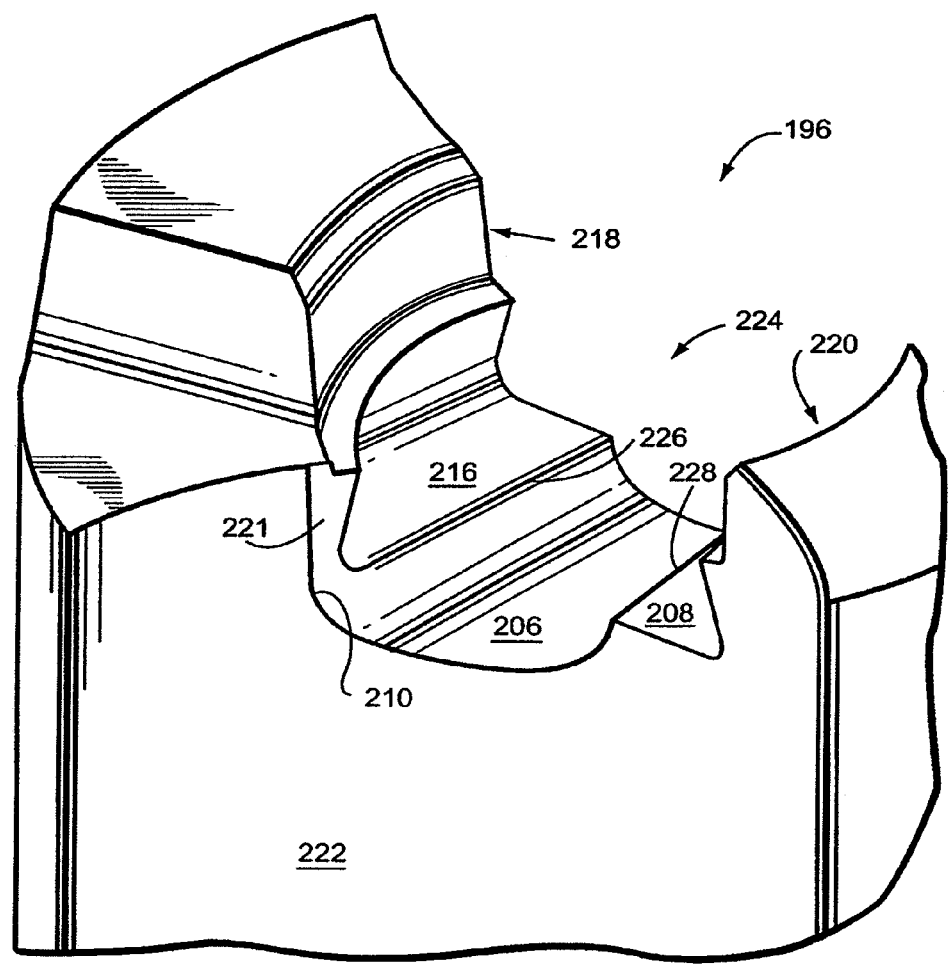
FIG. 9 is an enlarged perspective detail view of the embodiment of FIG. 8.

Turning now to FIG. 8, a further embodiment is shown wherein a cutting head 194 is installed to a shank 196. Cutting head 194 has a dovetail member 198 bearing an end surface 200. Pocket 202 of shank 196 is dimensioned and configured to contact base surface 204 of cutting head 194 for resisting compressive axial forces. Contact with end surface 200 of cutting head 194 is avoided. A shelf 208 and a relief trough 206 are formed in the floor or upwardly facing central surface of pocket 202. Trough 206 projects into shank 196, extending towards the trailing end of the tool assembly comprising cutting head 194 and shank 196. Trough 206 extends across and fully spans the floor from one flute 222 to opposed flute 224. A better understanding of the geometry of shank 196 will be obtained by also referring to FIG. 9. The floor of pocket 202, which floor collectively encompasses trough 206, shelf 208, and shelf 216, separates and spaces apart one pocket wall 218 from opposed second pocket wall 220. Referring especially to FIG. 9, shelves 208, 216 each extend laterally across the floor at respective upper edges 226, 228 of relief trough 206. Each shelf 208 or 216 is associated with one pocket wall 218 or 220. Relief trough 206 is angularly oriented relative to rotational axis 230 such that each shelf 208 or 216 intersects only flute 222 or 224, being separated from the other flute 224 or 222 by trough 206. By way of further explanation, it will be seen that shelf 216 terminates at the right side, as depicted in FIG. 9, at flute 224, whereas at the left side in FIG. 9, shelf 216 is spaced apart from flute 222 by a surface 221 which appears as an upward extension of trough 206.

A consequence of this geometry is that trough 206 has at one end a curved end edge 210 which meets the side profile 214 of dovetail member 198 (see FIG. 8) at a tangent at a portion of dovetail member 198. Curved edge 210 has a significantly greater radius of curvature than does end edge 212 (see FIG. 8) located oppositely from end surface 210. The greater radius of curvature provides a transition in wall thickness which is gentler than the relatively small curvature seen at edge 212. Stress concentrations are thereby minimized at the corners of the walls of pocket 202 where dovetail member 198 terminates near the floor of the pocket at relief trough 206.

It will be appreciated that while the dovetail portion of the connector of the cutting head is described in terms of being frustoconical, it would be possible to utilize any configuration wherein there is an upwardly facing surface which can engage one or more corresponding surfaces formed in the retaining structure of the shank. It is preferred to form the dovetail of the connector as frustoconical merely because rotary machining and other inexpensive methods may be employed to form the dovetail.

The novel features presented herein may be present in combinations within a single tool made according to the present invention, where such embodiments are geometrically compatible, for example surface 221 also reduces the contact area between the dovetail and the pocket.

It will further be appreciated that relative locations of connecting and drive structure of the cutting head and of the shank may be reversed if desired, with appropriate accommodation being made to account for differences in the directions in which forces are imposed.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tool assembly for conducting rotary cutting operations on a work piece, comprising a tool shank and a replaceable cutting head which is installed on and engages the tool shank, the tool shank and the cutting head having a common rotational axis and complimentary peripheral surfaces when assembled together, the cutting tool assembly having a leading end which engages the work piece and a trailing end located oppositely from the leading end, relative to the rotational axis;

the shank having a pocket for coupling to the cutting head, an interlocking member arranged to retain the cutting head when the cutting head is installed within the pocket, at least one abutment surface abutting the cutting head when the cutting head is installed within the pocket, and at least one driving surface arranged to rotate the cutting head when the shank is rotated with the cutting head installed within the pocket;

the cutting head having, a peripheral base surface facing the pocket and a dovetail member located centrally along the common rotational axis, the dovetail member having a lateral surface oriented at an obtuse angle to the rotational axis, a cutting portion at the leading end of the cutting tool assembly, and a shank connection portion opposite the cutting portion and facing the trailing end of the shank connection portion, a corresponding interlocking member for engaging the interlocking member of the shank, a cutting head abutment surface abutting the shank when the cutting head is installed within the pocket, and a driven surface oriented to abut the driving surface of the shank when the cutting head is installed within the pocket;

wherein the pocket has at least one internally facing surface oriented to abut the lateral surface of the dovetail member of the cutting head, the internally facing surface being dimensioned and configured to abut the dovetail member of the cutting head along part of the extent of the lateral surface of the dovetail member and to avoid making contact along the balance of the lateral surface of the dovetail member, whereby the uncontacted portion of the pocket allows for deflection of the pocket walls when forces are imposed on the pocket by the cutting head during cutting operations of the cutting tool, thereby mitigating radial deflection of the pocket walls.

2. The cutting tool assembly according to claim 1, wherein the cutting head includes a lateral recess forming part of a flute, and the shank has a complementing lateral recess which continues the part of a flute formed in the cutting head in continuous and undistorted fashion when the cutting head is installed within the pocket of the shank.

3. The cutting tool assembly according to claim 1, wherein the lateral surface of the dovetail member oriented at an obtuse angle comprises a first arcuate portion when viewed in plan, a second arcuate portion when viewed in plan, a first chamfered portion arranged to reduce the diameter of the dovetail member compared to a diameter taken at the arcuate portion when viewed in plan, and a second chamfered portion arranged to reduce the diameter taken at the arcuate portion of the dovetail member when viewed in plan, wherein the first chamfered portion is spaced apart from the second chamfered portion, thereby separating the first arcuate portion from the second arcuate portion, and wherein the pocket contacts only the first arcuate portion and the second arcuate portion and avoids contacting the first chamfered portion and the second chamfered portion.

4. The cutting tool assembly according to claim 1, wherein the at least one internally facing surface of the pocket comprises a first arcuate section when viewed in plan, a second arcuate section when viewed in plan, a first chamfered portion, and a second chamfered portion, wherein the first chamfered portion and the second chamfered portion separate the first arcuate section from the second arcuate section, and the at least one internally facing surface of the pocket makes contact with the dovetail member of the cutting head only at the first arcuate section and the second arcuate section, and avoids making contact with the dovetail member of the cutting head at the first chamfered portion and at the second chamfered portion.

5. The cutting tool assembly according to claim 1, wherein the dovetail member of the cutting head has a first radius and the internally facing surface of the pocket has a second radius greater in magnitude than the first radius of the cutting head such that contact between the cutting head and the internally facing surface of the pocket is limited to an extent less than the full extent of the internally facing surface of the pocket when the cutting head is installed within the pocket.

6. A cutting tool assembly for conducting rotary cutting operations on a work piece, comprising a tool shank and a replaceable cutting head which is installed on and engages the tool shank, the tool shank and the cutting head having a common rotational axis and mating peripheral surfaces when assembled together, the cutting tool assembly having a leading end which engages the work piece and a trailing end located oppositely from the leading end, relative to the rotational axis;

the shank having a pocket for coupling to the cutting head, an interlocking member arranged to retain the cutting head when the cutting head is installed within the pocket, at least one abutment surface abutting the cutting head when the cutting head is installed within the pocket, and an outer wall bearing at least one driving surface arranged to rotate the cutting head when the shank is rotated with the cutting head installed within the pocket;

the cutting head having a peripheral base surface facing the pocket and a dovetail member located centrally along the common rotational axis, the dovetail member having a lateral surface oriented at an obtuse angle to the rotational axis, a cutting portion at the leading end of the cutting tool assembly, and a shank connection portion opposite the cutting portion and facing the trailing end of the shank connection portion, a corresponding interlocking member for engaging the interlocking member of the shank, a cutting head abutment surface abutting the shank when the cutting head is installed within the pocket, and a driven surface oriented to abut the driving surface of the shank when the cutting head is installed within the pocket; wherein the driving surface of the shank is disposed out of radial orientation with respect to the rotational axis such that the driving surface has a leading inner portion and a trailing outer portion, whereby resistive forces imposed by the cutting head during cutting operations acting perpendicularly against the driving surface have an inward component tending to compress the wall of the pocket inwardly during cutting operations, thereby opposing forces imposed the cutting head which would otherwise tend to spread open the pocket.

7. The cutting tool assembly according to claim 6, wherein the cutting head includes a lateral recess forming part of a flute, and the shank has a complementing lateral recess which continues the part of a flute formed in the cutting head in continuous and undistorted fashion when the cutting head is installed within the pocket of the shank.

8. A tool shank for a cutting tool assembly for conducting rotary cutting operations on a work piece, which cutting tool assembly includes a replaceable cutting head which is installed on and engages the tool shank, wherein the tool shank and the cutting head having a common rotational axis and mating peripheral surfaces when assembled together, the cutting tool assembly having a leading end which engages the work piece and a trailing end located oppositely from the leading end, relative to the rotational axis, the tool shank comprising:

a circumferential surface and two opposed flutes each projecting into the tool shank along the circumferential surface;

a pocket for coupling to the cutting head, comprising a first pocket wall and a diametrically opposed second pocket wall spaced apart from the second pocket wall;

an interlocking member formed in the pocket and arranged to retain the cutting head when the cutting head is installed within the pocket; and at least one abutment surface abutting the cutting head when the cutting head is installed within the pocket, and at least one driving surface arranged to rotate the cutting head when the shank is rotated with the cutting head installed within the pocket, wherein the pocket has a floor which separates and spaces apart the first pocket wall from the second pocket wall and which bears a relief trough projecting into the shank towards the trailing end of the cutting tool assembly and extending across and spanning the floor from one flute to the other flute, a first shelf extending laterally across the floor at an upper edge of the relief trough at the first pocket wall and a second shelf extending laterally across the floor at another upper edge of the relief trough at the second pocket wall, and the relief trough is angularly oriented relative to the rotational axis such that the first shelf intersects only one flute and the trough is disposed between the first shelf and the other flute, and the second shelf intersects only one flute and the trough is disposed between the second shelf and the other flute.

* * * * *